United States Patent Office 3,657,322
Patented Apr. 18, 1972

3,657,322
CYCLOALIPHATIC DIALKYLHYDROXYPHENYL-
ALKANOATES
Martin Dexter, Briarcliff Manor, and David H. Steinberg,
Bronx, N.Y., assignors to Ciba-Geigy Corporation,
Ardsley, N.Y.
No Drawing. Continuation-in-part of application Ser. No.
372,083, June 2, 1964. This application June 26, 1967,
Ser. No. 648,998
Int. Cl. C07c 69/76
U.S. Cl. 260—473 S     3 Claims

ABSTRACT OF THE DISCLOSURE

Alkylhydroxyphenylalkanoic acid esters of mono- and polyhydric alicyclic alcohols, prepared by known esterification or transesterification procedures, are stabilizers of organic material subject to oxidative deterioration.

CROSS REFERENCE

This is a continuation-in-part of copending application Ser. No. 372,083, filed June 2, 1964, now abandoned.

DETAILED DESCRIPTION

This invention pertains to alkylhydroxyphenylalkanoic acid esters of mono- and polyhydric alicyclic alcohols, and to compositions otherwise subject to oxidative deterioration stabilized by the incorporation therein of such esters.

In particular, the present invention relates to alicyclic compounds having from 4 to 12 carbon atoms in the alicyclic ring and consisting of:

(a) From 1 to 6 divalent alkylhydroxyphenylalkanoyl-oxyalkylene units of the structure:

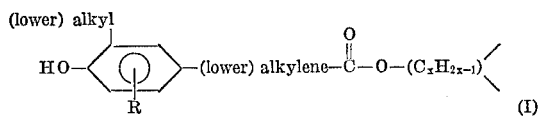

wherein:

$x$ is 1 or 2, and
R is hydrogen or lower alkyl; and (b) From 0 to 3 divalent aliphatic chains of from 1 to 11 carbon atoms; both of the free valences of any such divalent aliphatic chain being bound to the same or to separate divalent alkylhydroxyphenylalkanoyloxyalkylene units of the above structure, and each of the free valences of any alkylhydroxyphenylalkanoyloxyalkylene unit, independent of the other free valence of the same unit, being bound either to a separate divalent alkylhydroxyphenylalkanoyloxyalkylene unit of the above structure or to a free valence of a divalent aliphatic chain.

By the term "alkyl" and derivations thereof employing the root "alk," such as "alkylene," or "alkylidene," "alkanoyl" and the like, is intended a group containing a branched or straight chain hydrocarbon chain of from 1 to 20 carbon atoms inclusively. Representative of such alkyl groups are thus methyl, ethyl, propyl, butyl, t-butyl, octyl, decyl, dodecyl, tetradecyl, octadecyl, eicosyl and the like. When the term "alkyl" is herein qualified by the designation "(lower)," there is intended a branched or straight chain hydrocarbon of from 1 to about 6 carbon atoms.

It will be observed in Formula I that the alkanoyl portion of these alicyclic esters bears a (lower)alkyl-p-phenolic group. This phenolic group exhibits at least one (lower)alkyl group, in a position ortho to the hydroxy group. A second (lower)alkyl group (R) is optionally present either (a) in the other position ortho to the hydroxy group or (b) meta to the hydroxy group and para to the first (lower)alkyl group. Referred are the di(lower)alkyl-p-phenolic groups, e.g., R is (lower)alkyl, and although not so limited, the (lower)alkyl groups on the p-phenolic group are preferably branched groups such as t-butyl. Other arrangements, however, such as for example a 3-t-butyl-6-methyl-p-phenolic group or a 3,5-dimethyl-p-phenolic group are included.

It will be appreciated from the foregoing description associated with Formula I that the mono- and polyhydric alicyclic alcohols from which the esters of the present invention are derived will contain a fundamental alicyclic ring skeleton of from 4 to 12 carbon atoms, i.e., embrasive of the carbon skeletons of from cyclobutane to cyclododecane. This ring skeleton may be considered as composed of (a) several divalent units of Formula I or (b) of (i) one or more such units and (ii) one or more divalent aliphatic chains.

In a first embodiment of this invention, the alicyclic alcohol is monohydric and the novel ester derived thereform will contain one of the above defined divalent alkylhydroxyphenylalkanoyloxyalkylene units, hereafter "divalent ester unit" and one divalent aliphatic chain of up to 11 carbon atoms, hereafter "divalent aliphatic chain." The divalent aliphatic chain in the case of esters derived from monohydride alcohols will contain at least three carbon atoms, preferably 4 to 5, the two valence bonds being on different, non-adjacent carbon atoms of the chain. Each of the two valence bonds of this divalent aliphatic chain is joined to one of the two bonds of the divalent ester unit, thereby constituting an alicyclic ring having at least 4 carbon atoms in the ring skeleton. Thus, for example, the novel esters derived from the monohydric alcohol cyclopentanol will contain (a) a single divalent ester unit of the defined structure wherein that portion of the structure $-(C_xH_{2x-1})<$ is methylidyne, $x$ thus being 1, and (b) the single divalent aliphatic chain tetramethylene, whereas the ester derived from cyclohexanol will contain the identical divalent ester unit but the divalent aliphatic chain pentamethylene. The novel esters derived from 1,4-dimethylcyclohexane-1-ol, on the other hand, will contain (a) a single divalent ester unit of the defined structure wherein $-(C_xH_{2x-1})<$ is ethylidyne, $x$ thus being 2, and (b) the single divalent aliphatic chain 3-methylpentamethylene. The compounds thus embraced by this first embodiment may be represented by the formula:

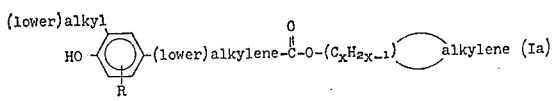

In a second embodiment of this invention, the alicyclic alcohol from which these esters are derived is polyhydric, containing from 2 to 6 hydroxy groups in the ring skeleton, the number of divalent ester units in the final ester corresponding to the number of hydroxy groups in the alcohol from which it is derived. The polyhydric alicyclic alcohol may be fully hydroxylated, i.e. each of the carbon atoms making up the ring skeleton bears a hydroxy group, in which case the esters derived from such an alcohol will consist of from four to six divalent ester units and no divalent aliphatic chains, each of the divalent ester units being bound to two other such units. For example, the esters derived from the inositols will contain six divalent units as defined above wherein $-(C_xH_{2x-1})<$ is methylidyne, $x$ thus being 1. The compounds thus represented by this first aspect of this second embodiment may be represented by the formula:

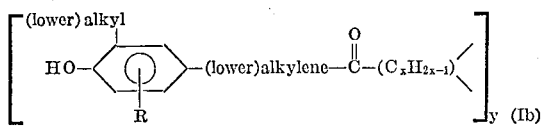

wherein y has a value of from 4 to 6.

In another aspect of this second embodiment, the polyhydric alicyclic alcohol from which these esters are derived are partially hydroxylated, i.e., some but not all of the ring carbon atoms making up the ring skeleton bear a hydroxy group. The hydroxy groups of such partial hydroxylated alicyclic alcohols may (a) be on adjacent carbon atoms; (b) on nonadjacent carbon atoms or (c) a combination of the foregoing. As an example of the first of these, (a), the alcohols cyclopentane-1,2-diol; cyclohexanol-1,2-diol and cyclooctane-1,2-diol may be mentioned. The esters of the present invention derived from these three alcohols will thus each contain two divalent ester units as previously defined wherein $-(C_xH_{2x-1})<$ in each is methylidyne, one valence bond of one of these units being joined to one valence bond of the other with the remaining valence bond of each of the units being bound to the divalent alicyclic chains trimethylene, tetramethylene and hexamethylene, respectively. Such compounds may thus be represented as follows:

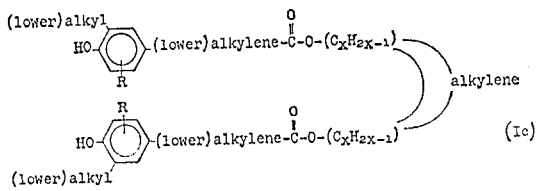

As examples of the second class, (b), of partially hydroxylated polyhydric alicyclic alcohols, there may be cited 2,2,4,4 - tetramethylcyclobutane - 1,3 - diol; 2,2,4,4,6,6 - hexamethylcyclohexane - 1,3,5 - triol; cyclohexane-1,3-diol; cyclodecane - 1,6 - diol; and 1,4-di-(hydroxymethyl)cyclohexane. In esters derived from the first four of these, the divalent ester units will have methylidyne as the group $-(C_xH_{2x-1})<$ whereas in the last, this group will be ethylidene ($-CH_2CH<$). Each of the divalent ester units will be separated by a divalent aliphatic chain. Thus in the case of 2,2,4,4-tetramethylcyclobutane - 1,3 - diol and 2,2,4,4,6,6 - hexamethylcyclohexane-1,3,5-triol, each divalent ester unit is joined to a separate isopropylidene chain. In the case of cyclohexane-1,3-diol each divalent ester unit is joined both to a methylene group and to a trimethylene chain, while in the case of cyclodecane-1,6-diol, each divalent ester unit is joined to two separate tetramethylene chains. Similarly in the case of 1,4 - di(hydroxymethyl)cyclohexane, each divalent ester unit is joined to two separate ethylene chains. Such compounds may be represented by the formula:

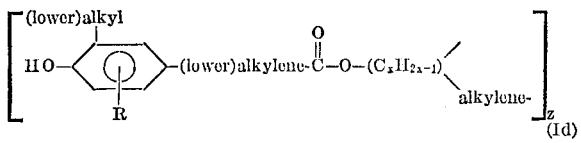

wherein z has a value of from 2 to 4.

The third class of partially hydroxylated polyhydric alicyclic alcohols is a combination of the first two and may be exemplified by a compound such as cyclohexane-1,2,4-triol. In the ester derived therefrom one of the valences of each of two divalent ester units are joined to one another, the remaining valence on one of these units being joined to a methylene group while the remaining valence on the other of these two units is joined to an ethylene chain. The second valence of the methylene group and that of the ethylene group are joined through the third divalent ester unit.

While the foregoing alcohols can exist in the form of different stereoisomers, e.g., optical isomers and/or geometric isomers, this does not affect the properties of the final esters. Thus either a mixture of such isomers or the separated isomers themselves can be subjected to the procedures herein described without substantially altering the properties of the final esters obtained.

These alkylhydroxyphenylalkanoic acid esters of mono- and polyhydric alicyclic alcohols are stabilizers of organic material normally subject to oxidative deterioration. Materials which are thus stabilized according to the present invention include synthetic organic polymeric substances such as vinyl resins formed from the polymerization of vinyl halides or from the copolymerization of vinyl halides with unsaturated polymerizable compounds, e.g., vinyl esters, $\alpha,\beta$-unsaturated ketones, $\alpha,\beta$-unsaturated aldehydes and unsaturated hydrocarbons such as butadienes and styrene; poly-$\alpha$-olefins such as polyethylene, polypropylene, polybutylene, polyisoprene and the like, including copolymers of poly-$\alpha$-olefins; polyurethanes such as are prepared from polyols and organic polyisocyanates; polyamides such as polyhexamethylene adipamide; polyesters such as polymethylene terephthalates; polycarbonates polyacetals; polystyrene, polyethyleneoxide; and copolymers such as those of high impact polystyrene containing copolymers of butadiene and styrene and those formed by the copolymerization of acrylonitrile, butadiene and/or styrene. Other materials stabilized according to the present invention include lubricating oil of the aliphatic ester type, e.g., di-(2-ethylhexyl)-azelate, pentaerythritol tetracaproate and the like; animal and vegetable derived oils, e.g., linseed oil, fat, tallow, lard, peanut oil, cod liver oil, castor oil, palm oil, corn oil, cotton seed oil and the like; hydrocarbon material such as gasoline, both natural and synthetic diesel oil, mineral oil, fuel oil, drying oil, cutting fluids, waxes, resins and the like, fatty acids such as soaps and the like.

In general the stabilizers of this invention are employed from about 0.005% to about 10% by weight of the stabilized composition. A particularly advantageous range for polyolefins such as polypropylene is from about 0.1% to about 1%.

The compounds of the present invention may be prepared via a number of procedures. In one method the acid of the formula:

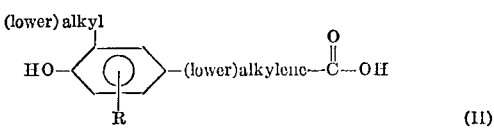

and a mono- or polyhydric alcohol are allowed to react in the presence of an acid catalyst such as p-toluenesulfonic acid. In a second method, the acid chloride of the acid represented by Formula II is allowed to react with the mono- or polyhydric alcohol, preferably in a solvent such as pyridine, lutidine or the like. In a third method a lower alkyl ester of the acid of Formula II, generally the methyl ester, is transesterified with the mono- or polyhydric alcohol in the presence of a base such as lithium or sodium hydride, sodium methoxide, potassium hydroxide or the like, optionally in the presence of an inert solvent such as dimethylsulfoxide, dioxane, tetrahydrofuran, dimethylformamide or the like. In a fourth method, the silver salt of the acid of Formula II is allowed to react with the mono- or polychlorinated analog of the mono- or polyhydric alcohol. Other methods of esterification which are disclosed in the art may be similarly employed. The requisite acids of Formula II, their lower alkyl esters and their acid chlorides, as well as their methods of preparation are known. The mono- and polyhydric alcohols are also known and may be prepared via a wide variety of synthetic routes, as described for example in The Chemistry of Carbon Compounds; E. G. Rodd, ed., Alicyclic Compounds, vol. IIA, Elsevier, 1953.

Typical of suitable mono- and polyhydric alicyclic alcohols are the following:

cyclobutanol
cyclobutylcarbinol
cyclobutylmethylcarbinol
2,2,4,4-tetramethylcyclobutane-1,3-diol
cyclopentanol
cyclopentane-1,2-diol
3-methylcyclopentane-1,2-diol
1,2-dimethylcyclopentane-1,2-diol
2,3-dimethylcyclopentane-1,2-diol
cyclohexanol
4-methylcyclohexanol
cyclohexane-1,3-diol
cyclohexane-1,4-diol
3-methylcyclohexane-1,2-diol
2,2,5,5-tetramethylcyclohexane-1,3-diol
1,4-di-(hydroxymethyl)cyclohexane
cyclohexane-1,2,3-triol
cyclohexane-1,3,5-triol
2,2,4,4,6,6-hexahydrocyclohexane-1,3,5-triol
cyclohexane-1,2,3,4,5-pentol
cyclohexane-1,2,3,4,5,6-hexol
cycloheptane-1,2-diol
cyclononane-1,2-diol
cyclodecane-1,2-diol
cyclodecane-1,6-diol and
cyclododecane-1,2-diol The following examples will serve to further typify the nature of the present invention without being a limitation thereof.

EXAMPLE 1

1,3-bis-[3-(3,5-di-t-butyl-4-hydroxyphenyl)-propionyloxy]-2,2,4,4-tetramethylcyclobutane A mixture of 30.62 g. (0.11 mole) of 3-(3,5-di-t-butyl-4-hydroxyphenyl)propionic acid and 0.5 g. (2.60 mmole) of p-toluene sulfonic acid monohydrate in 100 ml. of xylene is heated with stirring at reflux under distillation conditions until the distillate is no longer turbid. The mixture is cooled, 7.2 g. (0.05 mole) of 2,2,4,4-tetramethylcyclobutane-1,3-diol are added and this mixture is heated at reflux with stirring for 5.5 hours, during which time the reaction proceeds to about 95% completion (based on water formed as distillate and consumption of the acid starting material). The reaction mixture is cooled, washed several times with 100 ml. portions of water until the washings are neutral and several times with 100 ml. portions of 5% aqueous sodium carbonate solution. The basic extracts are combined and extracted four times with 50 ml. portions of ether and these ethereal extractions combined with the original xylene solution and washed twice with saturated chloride solution, dried over sodium sulfate and evaporated to yield the product. This is further purified by trituration and recrystallization from ethanol, M.P. 131–133° C.

*Analysis.*—Calcd. (percent): C, 75.86; H, 9.70. Found (percent): C, 75.40; H, 9.49.

1,3 - bis - [6-(3,5-di-t-butyl-4-hydroxyphenyl)phenylhexanoyloxy]-2,2,4,4-tetramethylcyclobutane is obtained in a similar fashion by substituting 6-(3,5-di-t-butyl-4-hydroxyphenyl)hexanoic acid for 3-(3,5-di-t-butyl-4-hydroxyphenyl)propionic acid. Likewise from 3-(3-n-hexyl-4-hydroxy-5-t-butylphenyl)propionic acid there is obtained 1,3-bis-[3 - (3-n-hexyl-4-hydroxy-5-t-butylphenyl)-propionyloxy]-2,2,4,4-tetramethylcyclobutane.

EXAMPLE 2

1,3,5-tris-[3-(3,5-di-t-butyl-4-hydroxyphenyl)-propionyloxy]-2,2,4,4,6,6-hexamethylcyclohexane To a stirred cooled solution of 2.16 g. (0.010 mole) of 2,2,4,4,6,6-hexamethyl cyclohexane-1,3,5-triol in 50 ml. of pyridine is added in several portions over a 20 minute period, 10.69 g. (0.036 mole) of 3-(3,5-di-t-butyl-4-hydroxyphenyl)propionyl chloride. This mixture is stirred for 30 minutes at 0 to 5° C. and then for 15 hours at 45 to 50° C. The mixture is cooled to room temperature and poured into ice water. This mixture is then extracted several times with ethyl ether and these extracts are in turn washed with 2 N sulfuric acid, water, 5% aqueous sodium carbonate solution, water and finally saturated sodium chloride solution. The ethereal extracts are then dried over sodium sulfate and evaporated to yield the product. Further purification is achieved by means of chromatography through silica gel, eluting successively with heptane and benzene. Removal of solvent and drying to constant weight at 100°/0.1 mm. affords the product, M.P. 105–115° C.

*Analysis.*—Calcd. (percent): C, 75.86; H, 9.70. Found (percent): C, 75.93; H, 9.49.

EXAMPLE 3

1,2,3,4,5,6-hexakis-[3-(3,5-di-t-butyl-4-hydroxyphenyl)-propionyloxy]cyclohexane To a stirred mixture of 9.0 g. (0.05 mole) of inositol and 266 mg. of lithium hydride in 50 ml. of dimethyl sulfoxide are added under nitrogen, 96.6 g. (0.33 mole) of methyl 3-(3,5-di-t-butyl-4-hydroxyphenyl)propionate. This mixture is stirred under vacuum for 11 hours at 80–85° C./15–20 mm., during which time approximately 8.4 ml. of methanol are collected as distillate. The remaining solvent is removed by evaporation and the residue is heated for 45 minutes at 110° C./0.1 mm., cooled, an additional 266 mg. of lithium hydride are added and this mixture is heated for 5½ hours at 120° C./0.1 mm. and then cooled. The residue is warmed with 400 ml. of heptane and the resulting solution is filtered. The filtrate is treated with about 3 ml. of acetic acid, followed by an excess of potassium carbonate and the solvent is then removed by evaporation in vacuo. After removing fractions boiling at 132–144° C./0.1 ml. and at 144° C./0.1 ml., the residue is dissolved in hexane and chromatographed on alumina, eluting initially with hexane and finally with benzene to yield the product, M.P. 212–214° C., which may be further purified through recrystallization from benzene.

*Analysis.*—Calcd. (percent): C, 74.45; H, 9.02. Found (percent): C, 74.39; H, 8.69.

In a similar fashion by employing methyl 3,5-di-t-butyl-4-hydroxyphenylacetate and methyl 3-(3-methyl - 4 - hydroxy-5-t-butylphenyl)propionate, there are respectively obtained 1,2,3,4,5,6-hexakis-(3,5-di-t-butyl - 4 - hydroxyphenylacetoxy)cyclohexane and 1,2,3,4,5,6-hexakis-[3-(3-methyl - 4 - hydroxy-5-t-butylphenyl)propionyloxy]cyclohexane.

EXAMPLE 4

1,4-bis-[3,5-di-t-butyl-4-hydroxyphenyl)-propionyloxymethyl]cyclohexane

By treating 64.33 g. of methyl 3-(3,5-di-t-butyl-4-hydroxyphenyl)propionate and 14.42 g. of 1,4-di-(hydroxymethyl cyclohexane with 88.5 mg. of lithium hydride in the manner described in Example 3, the product of this example is obtained, M.P. 115–116° C.

*Analysis.*—Calcd. (percent): C, 75.86; H, 9.70. Found (percent): C, 76.09; H, 9.53.

EXAMPLE 5

By substituting equivalent quantities of methyl 3-(3,5-dimethyl-4-hydroxyphenyl)propionate and methyl 3-isopropyl-4-hydroxyphenylacetate for methyl 3-(3,5-di-t-butyl-4-hydroxyphenyl)propionate in the procedure of Example 3 and executing the steps therein described, there are respectively obtained 1,2,3,4,5,6-hexakis-[3-(3,5-dimethyl-4 - hydroxyphenyl)propionyloxy]cyclohexane and 1,2,3,4,5,6-hexakis-(3 - isopropyl - 4 - hydroxyphenylacetoxy)-cyclohexane.

EXAMPLE 6

1,2-bis-[3-(3,5-di-t-butyl-4-hydroxyphenyl) propionyloxy]cyclododecane

A mixture of 6.01 g. (0.030 mole) of 1,2-dihydroxy-cyclododecane and 100 g. of p-toluenesulfonic acid monohydrate in 150 ml. of benzene is treated with 22.77 g. (0.082 mole) of 3-(3,5-di-t-butyl-4-hydroxyphenyl)propionic acid according to the procedure described in Example 1. Purification of the crude product is achieved through chromatography on silica gel, eluting successively with heptane, 1:1 heptane:benzene and benzene to yield the product, M.P. 61-74° C.

*Analysis.*—Calcd. (percent): C, 76.62; H, 10.07. Found (percent): C, 76.30; H, 9.81.

EXAMPLE 7

Unstabilized polypropylene powder is blended with the indicated amounts (percent by weight) of the following typical compounds of this invention and milled at 182° C. for 10 minutes, after which time the polypropylene is sheeted and allowed to cool. The sheets are cut into small pieces and pressed for from 5 to 10 minutes on a hydraulic press at 175 lbs./in.$^2$ and 218° C. The resultant 25 mil samples are then subjected to accelerated aging in a forced draft oven at 149° C. The results are as fallows:

| Compound | Concentration | Hours to failure |
|---|---|---|
| (A) 1,3-bis-[3-(3,5-di-t-butyl-4-hydroxyphenyl) propionyl]-2,2,4,4-tetramethylcyclobutane. | 0.1 | 340 |
|  | 0.25 | 930 |
|  | 0.5 | 1,296 |
| (B) 1,3,5-tris-[3-(3,5-di-t-butyl-4-hydroxyphenyl)propionoxy]-2,2,4,4,6,6-hexamethylcyclohexane. | 0.1 | 67 |
|  | 0.25 | 1,420 |
|  | 0.5 | 956 |
| (C) 1,2,3,4,5,6-hexakis-[3-(3,5-di-t-butyl-4-hydroxyphenyl)-propionyloxy]cyclohexane. | 0.1 | 307 |
|  | 0.25 | 974 |
|  | 0.5 | 1,240 |
| (D) 1,2-bis-[3-(3,5-di-t-butyl-4-hydroxyphenyl)propionyloxy]-cyclododecane. | 0.1 | 660 |
|  | 0.25 | 642 |
|  | 0.5 | 1,413 |
| (E) 1,4-bis-[3-(3,5-di-t-butyl-4-hydroxyphenyl)propionyloxymethyl]cyclohexane. | 0.1 | 560 |
|  | 0.25 | 1,005 |
|  | 0.5 | 1,480 |
| (F) None | | 3 |

EXAMPLE 8

Incorporation of 0.5% by weight of dilauryl thiodipropionate and 0.1% of the compounds listed in Example 7 in polypropylene in the same manner as therein described, yields the following results.

| Compound | Hours to failure |
|---|---|
| A | 1335 |
| B | 1535 |
| C | 510 |
| D | 1998 |
| E | 1243 |

What is claimed is:

1. An ester of a fully hydroxylated polyhydric alicyclic alcohol, the ester consisting of from 4 to 6 divalent units of the formula:

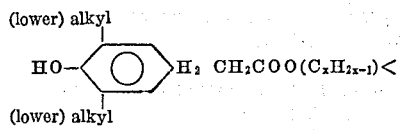

wherein $x$ has a value of 1 or 2, each of said divalent units being bound to two other such units through its two valence bonds.

2. An ester according to claim 1 wherein each (lower) alkyl group is tert. butyl.

3. An ester according to claim 2 wherein the compound is 1,2,3,4,5,6-hexakis-[3-(3,5-di-t-butyl - 4 - hydroxyphenyl)propionyloxy]cyclohexane.

References Cited

UNITED STATES PATENTS

| | | | |
|---|---|---|---|
| 3,112,338 | 11/1963 | Smutney et al. | 260—473 |
| 3,247,240 | 4/1966 | Meier et al. | 260—473 |
| 3,330,859 | 7/1967 | Dexter et al. | 260—473 |
| 3,422,059 | 1/1969 | Taylor et al. | 260—45.85 |

LORRAINE A. WEINBERGER, Primary Examiner

R. GERSTL, Assistant Examiner

U.S. Cl. X.R.

260—45.85